(12) United States Patent
Boren et al.

(10) Patent No.: US 8,783,190 B2
(45) Date of Patent: Jul. 22, 2014

(54) TROLLEY BRAKING SYSTEM

(76) Inventors: Daniel Blair Boren, Pukalani, HI (US); Brett J. Epstein, Jupiter, FL (US); Joel C. Haas, Jupiter, FL (US); Jesse E. Miller, Jupiter, FL (US); Gary P. Prus, Jupiter, FL (US)

( * ) Notice: Subject to any disclaimer, the term of this patent is extended or adjusted under 35 U.S.C. 154(b) by 37 days.

(21) Appl. No.: 13/419,239

(22) Filed: Mar. 13, 2012

(65) Prior Publication Data

US 2013/0239842 A1 Sep. 19, 2013

(51) Int. Cl.
*B61B 7/06* (2006.01)
*E01B 25/16* (2006.01)

(52) U.S. Cl.
USPC ........................ 104/117.1; 104/113

(58) Field of Classification Search
USPC ........................ 104/112, 113, 117.1
See application file for complete search history.

(56) References Cited

U.S. PATENT DOCUMENTS

| | | | |
|---|---|---|---|
| 547,528 A | 10/1895 | Weaver et al. | |
| 575,528 A | 1/1897 | Smallwood | |
| 1,087,063 A | 2/1914 | Izett | |
| 1,206,581 A | 11/1916 | Opsal | |
| 3,192,872 A | 7/1965 | Parent | |
| 4,934,277 A | 6/1990 | Smith et al. | |
| 4,948,118 A | 8/1990 | Miraglia | |
| 4,961,385 A | 10/1990 | Abouzakhm | |
| 5,113,768 A | 5/1992 | Brown | |
| 5,224,425 A | 7/1993 | Remington | |
| 5,224,426 A | 7/1993 | Rodunsky et al. | |
| 5,378,214 A | 1/1995 | Kreitenberg | |
| 5,904,638 A | 5/1999 | Habling et al. | |
| 5,931,100 A | 8/1999 | Sutton et al. | |
| 6,363,858 B1 | 4/2002 | Voirin | |
| 6,666,773 B1 | 12/2003 | Richardson | |
| 7,172,538 B2 * | 2/2007 | Keiser | 482/140 |
| 7,381,137 B2 | 6/2008 | Steele et al. | |
| 7,404,360 B2 | 7/2008 | Cylvick | |
| 7,549,377 B2 | 6/2009 | Pabst | |
| 7,637,213 B2 | 12/2009 | Cylvick | |
| 2002/0162477 A1 | 11/2002 | Palumbo | |
| 2003/0066453 A1 | 4/2003 | Cylvick | |
| 2004/0198502 A1 | 10/2004 | Richardson | |
| 2006/0027134 A1 | 2/2006 | Steele | |
| 2006/0288901 A1 | 12/2006 | Cylvick | |
| 2007/0169660 A1 | 7/2007 | Pabst | |
| 2008/0121132 A1 | 5/2008 | Cylvick | |
| 2008/0202375 A1 | 8/2008 | Quattlebaum | |
| 2009/0049946 A1 | 2/2009 | Buckman | |
| 2009/0223406 A1 | 9/2009 | Smith | |
| 2009/0255436 A1 | 10/2009 | Buckman | |
| 2009/0266267 A1 | 10/2009 | Moss | |
| 2010/0243374 A1 | 9/2010 | Boren et al. | |

OTHER PUBLICATIONS

International Search Report and Written Opinion (ISR/WO) for corresponding PCT application PCT/US2009/064322.

* cited by examiner

*Primary Examiner* — Zachary Kuhfuss
(74) *Attorney, Agent, or Firm* — Bryan Cave LLP

(57) ABSTRACT

A trolley braking system for smoothly reducing the speed of a rider supported by a harness on a cable or rope approaching a landing platform comprises a cylinder having a closed end and a piston slidably mounted in the interior. A braking cable is secured to the piston and routed through an opening in the closed end of the cylinder to a braking block, which is slidably mounted on the cable between the trolley and the landing platform. The system may also may also include a relief valve to release compressed air from the cylinder, so that the braking force may be controlled.

3 Claims, 11 Drawing Sheets

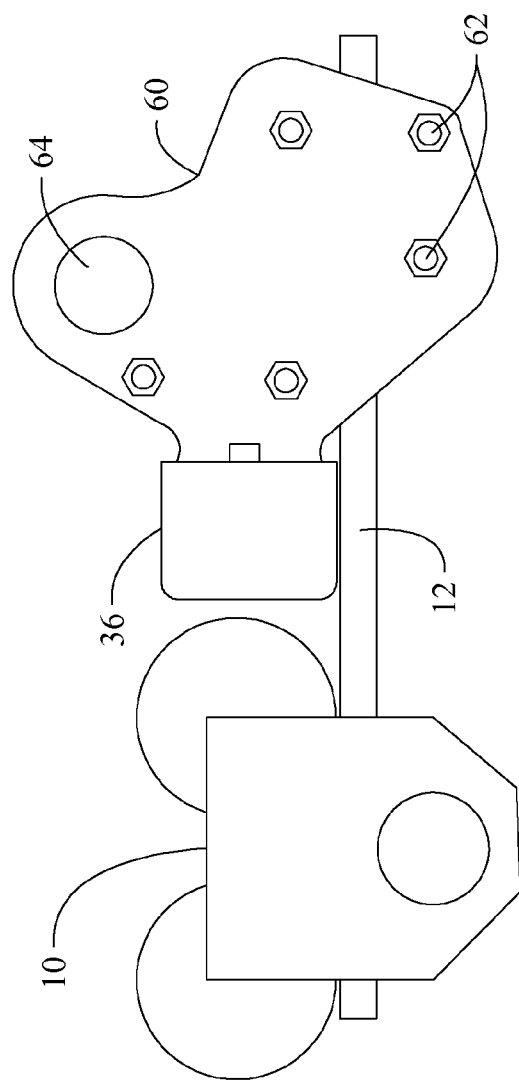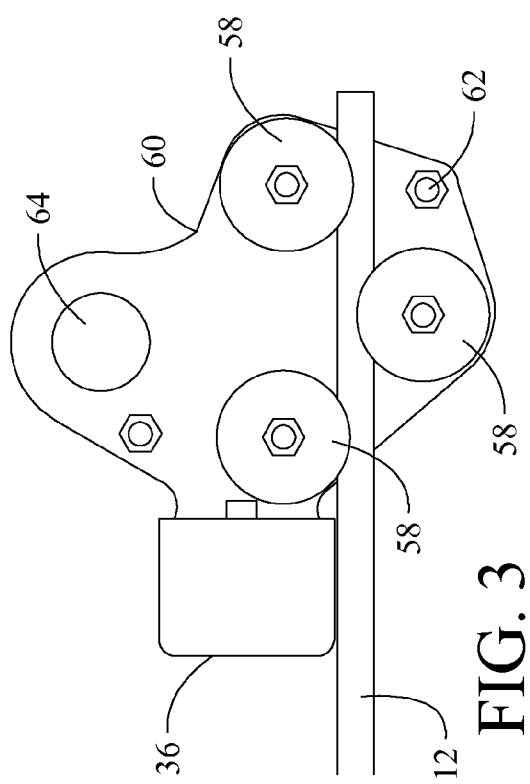

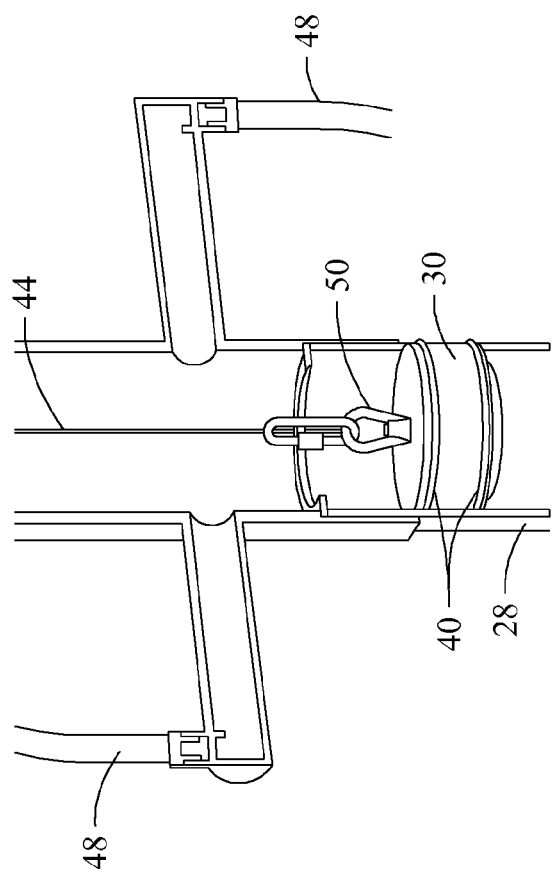
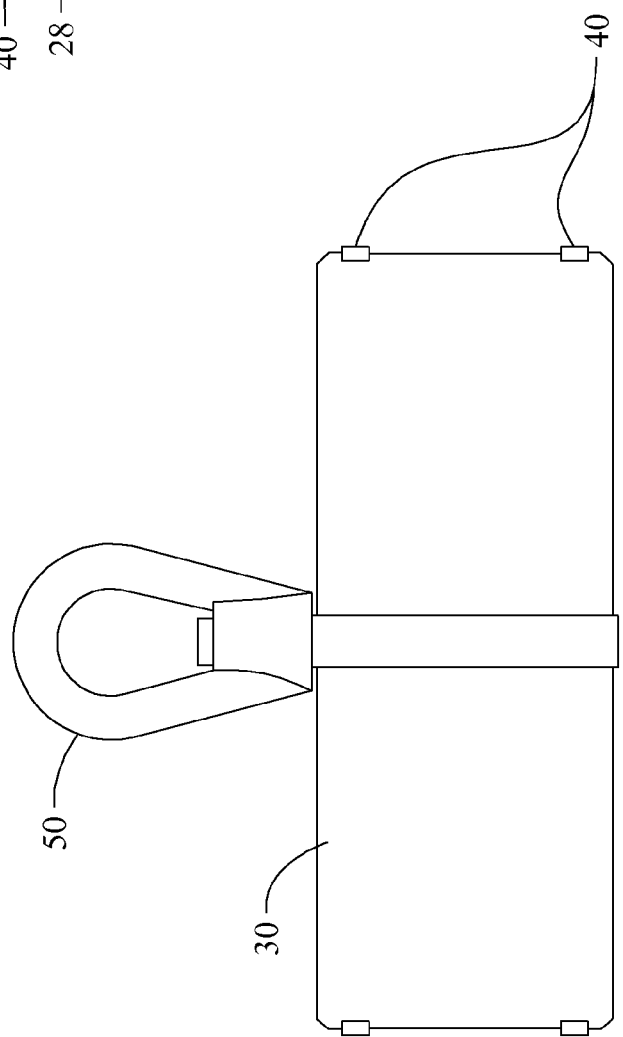

TROLLEY BRAKING SYSTEM

BACKGROUND

1. The Field of the Invention

The present invention is directed to a method and device for providing braking for a trolley traveling on a suspended cable or rope system.

2. The Background Art

Many prior art braking devices used to control the speed of trolleys provide braking force by contact between the cable or a pulley on the trolley with a friction surface on the trolley. The friction surface is therefore subject to wear and other conditions which may result in inconsistent and/or abrupt application of braking force. Also, it is desirable to ensure that the braking force is applied at the proper time for effectiveness and safety. Many such braking devices depend upon proper operation by the rider for satisfactory results.

BRIEF SUMMARY OF THE INVENTION

In view of the foregoing, in accordance with the invention as embodied and broadly described herein, a method and apparatus are disclosed for providing braking force to a trolley used to support a zipline rider which does not require the use of a friction surface on the trolley. Also, the braking device operates without the need for any action by the rider.

In selected embodiments, the braking system in accordance with the present invention may provide a braking force to a trolley as it travels along a cable suspending a rider by use of piston inside a pneumatic cylinder with a closed end. The cylinder and piston may be mounted in a fixed orientation proximate the cable. In one embodiment, a braking block is positioned on the zipline cable in front of the trolley as it approaches the landing platform. The braking block is attached by a flexible braking cable to the pneumatic piston inside the cylinder. As the trolley contacts the braking block, it forces the braking block forward towards the landing platform, and creates a tension force in the braking cable, which pulls the pneumatic piston further inside the closed end of the cylinder.

The braking resistance provided to the braking block, and consequently to the trolley, results from the resistance to the piston's movement by the accumulated compressed air created inside the cylinder as the pneumatic piston is drawn further into a cylinder by the braking cable, as the trolley travels forward towards the landing platform. The resulting compressed air which accumulates in the decreasing volume of the cylinder provides a smoothly increasing braking force applied to the trolley. Because the braking resistance is provided by the compression of the air in the braking cylinder generated by the kinetic energy of the zip line rider, there is no frictional braking element which needs to be replaced or which is subject to failure.

In selected embodiments, the braking system in accordance with the present invention may also include relief valves to vent controlled amounts of compressed air from the cylinder, so that the applied braking force may be adjusted. Such relief valves may be operated manually by a user such that the amount of braking force generated for a particular rider may be adjusted to accommodate the rider's weight and cable slope. Additionally or alternatively, a relief valve may be configured to be activated when the pneumatic piston is drawn into the cylinder a predetermined distance. In this manner, as the braking process is completed, the compressed air in the cylinder is automatically released, and the braking block is returned to its initial position on the zipline cable by the weight of the piston creating a tension force in the braking cable.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 3 is a side view of a braking block of one embodiment of a trolley braking system in accordance with the present invention.

FIG. 4 is a side perspective cross-sectional view of a braking block of one embodiment of a trolley braking system in accordance with the present invention.

FIG. 8 is a cross-sectional view of a pneumatic piston cylinder of one embodiment of a trolley braking system in accordance with the present invention.

FIG. 9 is a cross-sectional perspective view of a pneumatic piston inside a cylinder of one embodiment of a trolley braking system in accordance with the present invention.

DETAILED DESCRIPTION OF THE PREFERRED EMBODIMENTS

Figure 1:
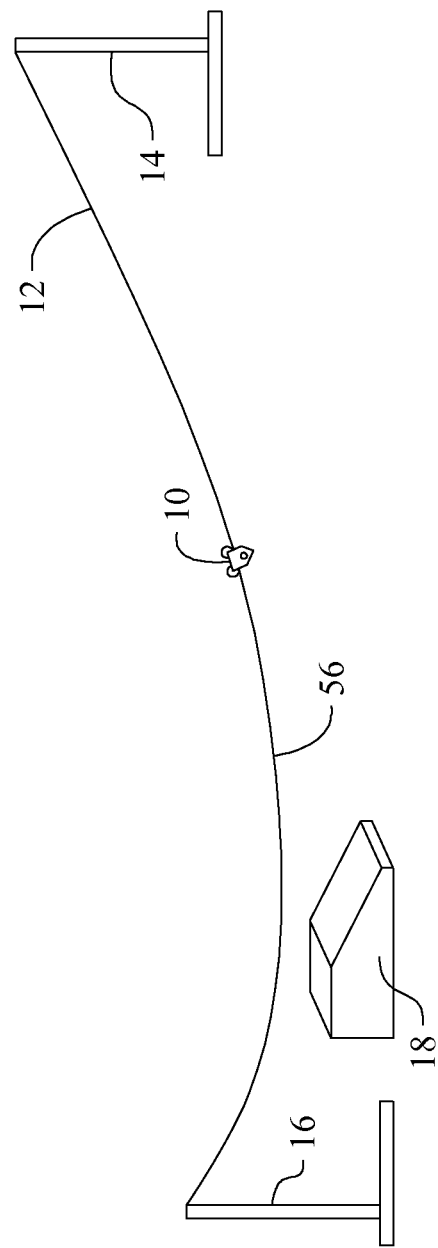
FIG. 1 is a schematic view of a typical use of a trolley on a suspended cable.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like, parts are designated, by like numerals throughout.

While a suspended cable or rope may provide the basis for an amusement ride, other uses are also contemplated, including ski lifts, gondolas, aerial trams, and suspended cable evacuation systems, such as oil derrick evacuation systems.

Referring to FIG. 1, in a typical zipline configuration, a trolley 10 is used for travel along a stranded steel wire cable or fiber rope 12 held in suspension by two or more supports 14 and 16, e.g., trees, towers, or platforms. A first support 14 may secure one end of the cable 12 at a higher elevation than a second support 16 which secures the other end of the cable 12. Accordingly, the trolley 10 is secured to roll along the cable 12 to travel by force of gravity from the first, upper support 14 toward the second, lower support 16. As the trolley travels downhill, braking is not necessary. However, as the rider approaches the landing platform 18, such as at braking point 56, braking becomes necessary to reduce the rider's speed for safe arrival at the landing platform 18.

Figure 2:
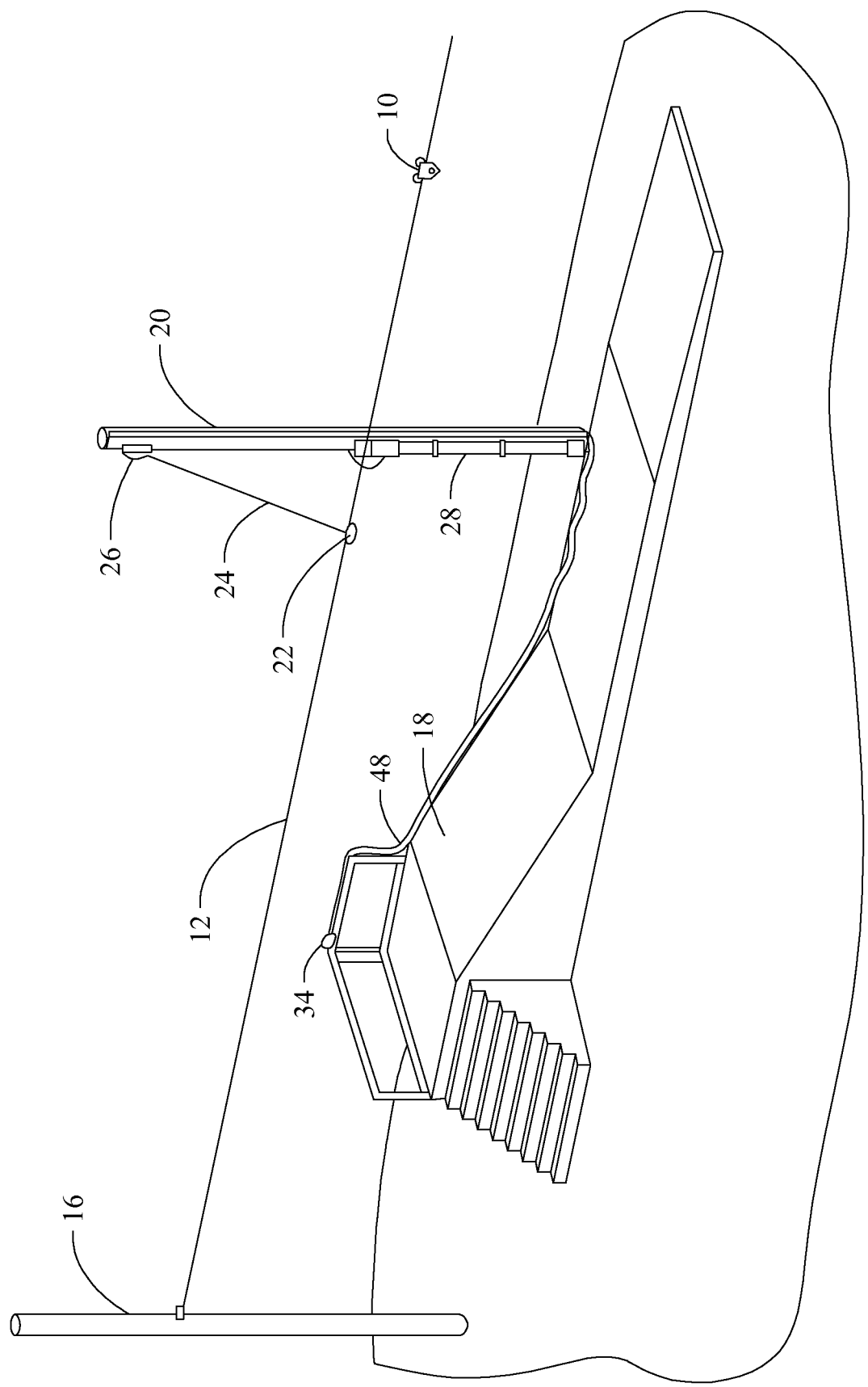
FIG. 2 is a perspective view of one embodiment of a trolley braking system in accordance with the present invention.

The present invention relates to a braking system to reduce the speed of zip line riders at a landing platform safely and effectively. As shown in FIG. 2, the system comprises a braking block 22 which is mounted on the same zip line cable 12 as the trolley 10 carrying the zip line rider. As shown in FIGS. 3 and 4, the braking block preferably includes one or more pulleys 58 to roll along the zip line cable 12, but any device capable of rolling or sliding along the cable while restraining the trolley 10 can be used, such as a block of PVC, ABS, nylon, wood, or other suitable material configured with an opening or other mechanism to receive and slide along the cable 12. As shown in FIGS. 3 and 4, the braking block preferably comprises an elastomeric bumper 36 made of urethane or other resilient material suitable to withstand and reduce the impact of the moving trolley 10 as it contacts the static braking block 22 in the ready position on the zip line cable 12 adjacent the support pole 20.

As shown in FIG. 2, the braking resistance is provided by a pneumatic piston 30 which is drawn into the braking cylinder 28 against the force of the compressed air which is accumulating in the decreasing volume of the cylinder 28 above the piston 30. The pneumatic braking cylinder 28 may be made of stainless steel, PVC, ABS, fiberglass, other metal or other suitable material for retention of compressed air. The piston 30 may be made of PVC, ABS, nylon, aluminum or other suitable material. The braking block 22 is attached to a braking cable 24, which is routed through a pivoting pulley 26 to a piston 30 in a pneumatic braking cylinder 28. The braking cable 24 may be made of stranded steel wire cable or fiber rope or other suitable material.

As shown in FIG. 2, the braking cylinder 28 is preferably mounted on a support pole 20, such as a utility pole, proximate to the landing platform 18, and offset laterally from the axis of the zip line cable 12 to avoid interference with the operation of the zip line.

Figure 5:
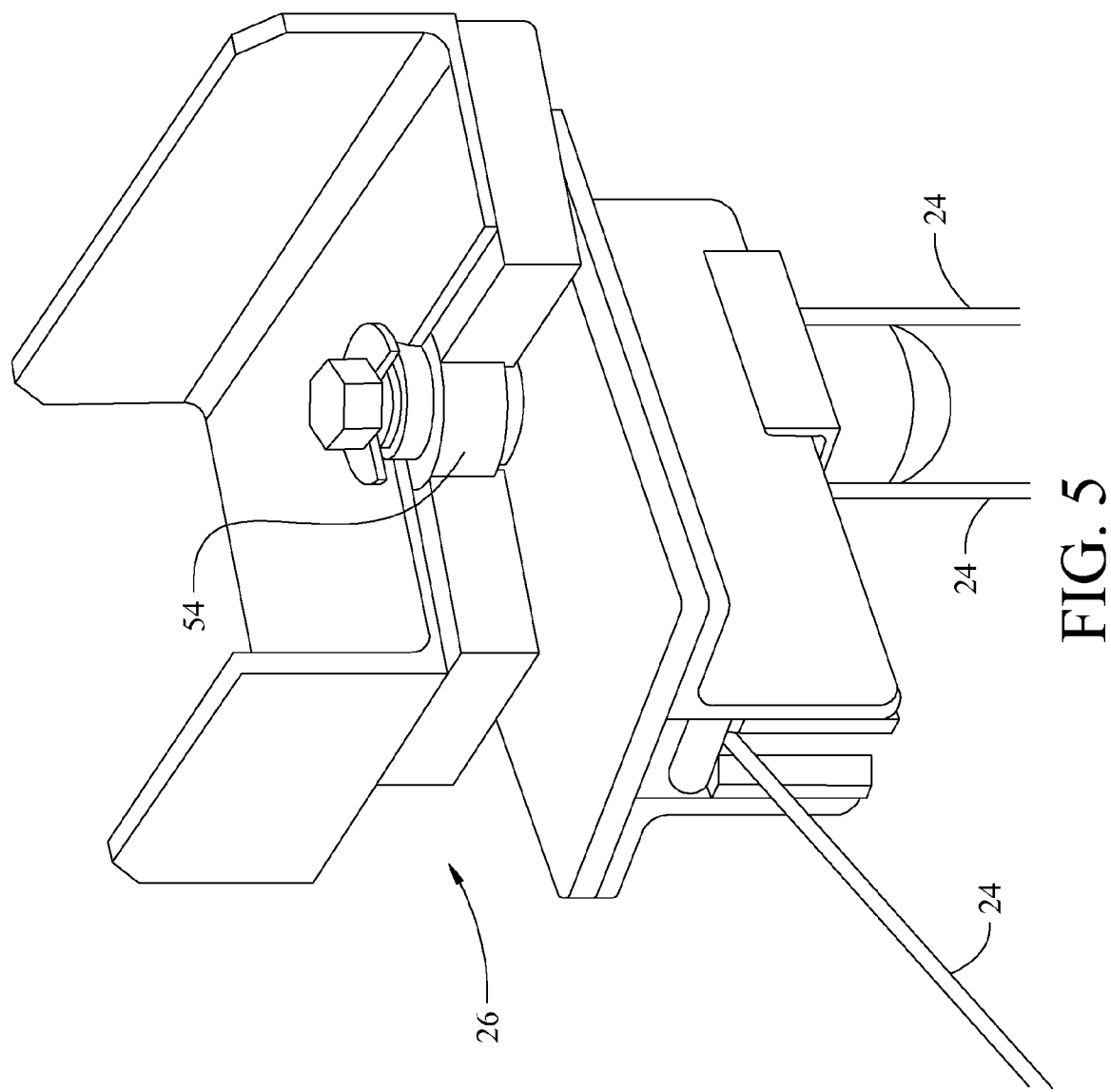
FIG. 5 is a side perspective view of a pivoting pulley assembly of one embodiment of a trolley braking system with a partial cross-sectional view of the spindle bearing in accordance with the present invention.
Figure 6:
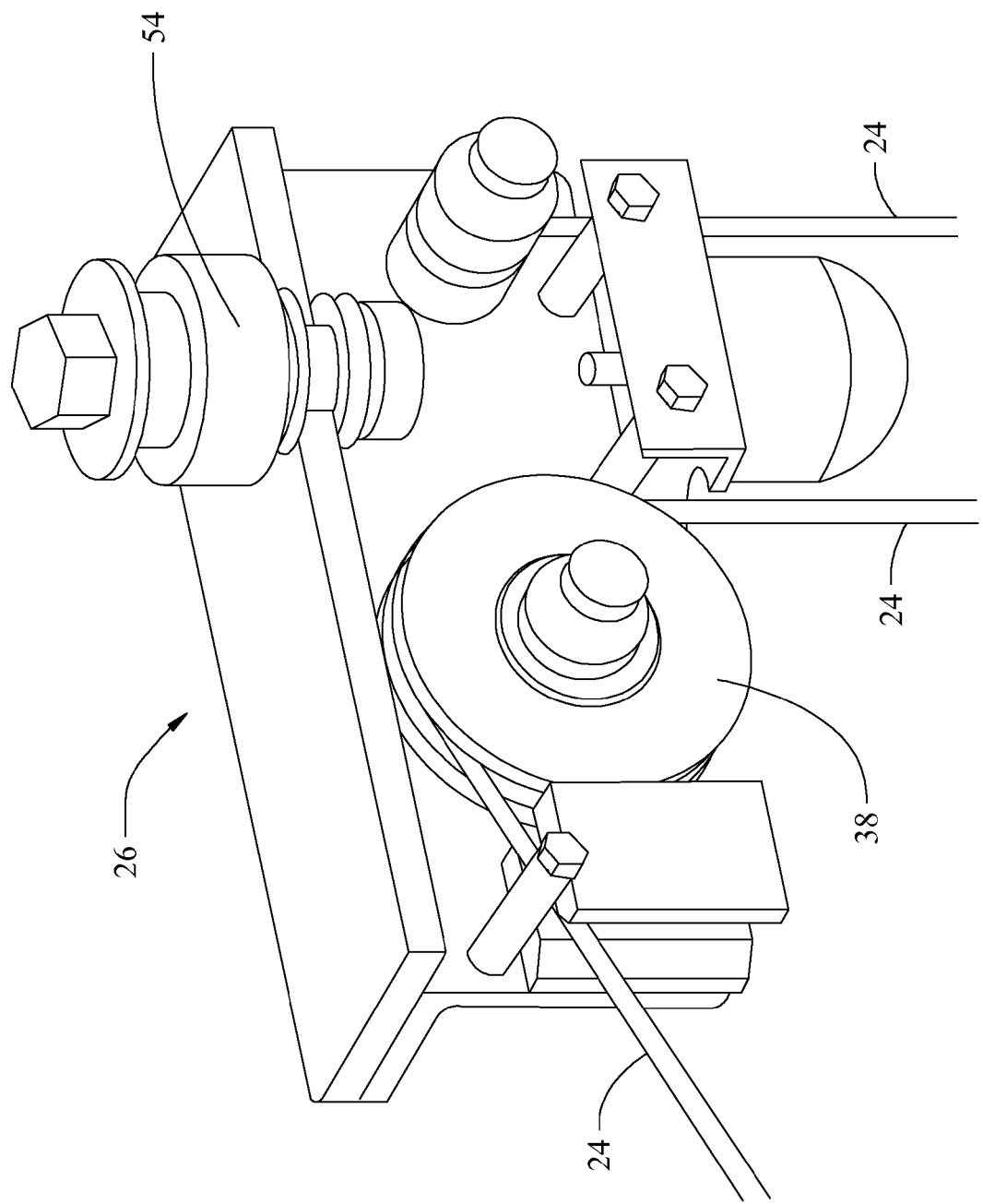
FIG. 6 is a side perspective cross-sectional view of a pivoting pulley assembly of one embodiment of a trolley braking system in accordance with the present invention.

As shown in FIGS. 2, 5 and 6, the braking cable 24 is attached to the support pole 20 using a pivoting pulley 38 on a pivoting pulley assembly 26, which is preferably mounted on the support pole 20 above the axis of the zip line cable 12. As shown in FIGS. 5 and 6, the pivoting pulley assembly 26 is configured to rotate freely on a vertical axis by use of a spindle bearing 54, which allows the braking cable 24 to remain aligned in the direction of the pivoting pulley 38 as the braking block 22 is driven along the zip line cable 12 by the trolley 10 towards the landing platform 18. The laterally and vertically offset orientation of the pivoting pulley 38 from the zip line cable 12 provides a progressively increasing braking force as the rider proceeds down the zip line cable 12. As the direction of the braking cable 24 extending from the support pole 20 approaches the axis of the zip line cable 12, the magnitude of the resulting force from the braking cable 24 on the trolley in the direction along the axis of the zip line cable 12 also increases.

In one preferred embodiment of the present invention, the braking block 22 also provides additional braking resistance from friction applied to the cable 12 by the braking block bumper 36 as the braking line 24 provides increasing resistance to the braking block 22. The torque from the braking action produces a rotational movement around an axis perpendicular to the plane of the braking block plate 60, which causes the forward end of braking block 22 to rotate upwards and away from the cable 12 depending upon the angle between the braking cable 24 and the axis of the cable 12, and a corresponding downward force on the braking block bumper 36 against the upper surface of the cable 12. This force on the braking block bumper 36 against the upper surface of the cable 12 causes frictional drag on the braking block 22, and the trolley 10, which is trailing and forcing against the braking block bumper 36. The amount of frictional braking force applied from the resistance tension imparted upon the braking block 22 can be modified by adjusting the height of the braking line attach point 64 above the axis of the cable 12. As this height is increased, the frictional force imparted upon the cable 12 by the braking block bumper 36 commensurately increases.

This torsional force on the braking block bumper 36 progressively increases as the braking resistance tension applied from the braking cable 24 increases as the piston 30 travels further into the cylinder 28. Also, as the direction of the braking cable 24 extending from the support pole 20 approaches the axis of the zip line cable 12, the magnitude of the resulting torsional force from the braking cable 24 on the trolley in the direction along the axis of the zip line cable 12 also increases As is known and appreciated in the art, other configurations of the frictional element in the braking block bumper 36 may be used, such as friction pads or other types of frictional surfaces located above the cable at the aft portion of the braking block, or below the cable 12 at the forward portion of the braking block.

Figure 7:
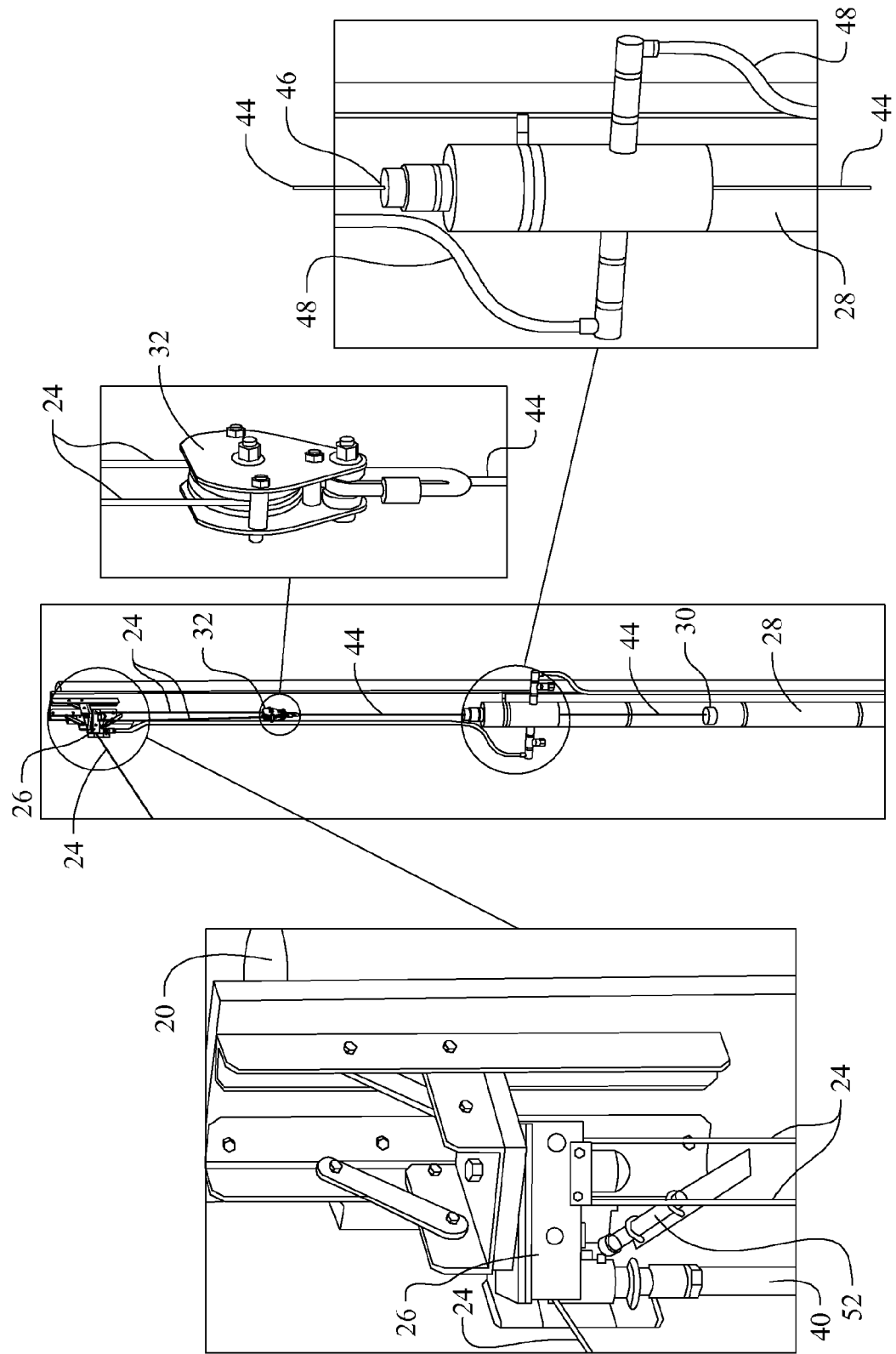
FIG. 7 is an exploded perspective view of a support pole assembly illustrating the pivoting pulley and pneumatic cylinder of one embodiment of a trolley braking system in accordance with the present invention.

As shown in FIG. 7, the braking cable 24 is preferably connected to the pneumatic piston 30 through a pulley block 32, which increases the mechanical advantage of braking block 22 and braking cable 24 over the pneumatic piston 30 by a factor of two. Thus, the pneumatic piston 30 only needs to travel one half the distance of the braking cable 24 during the braking process. Accordingly, in one preferred embodiment, due to the combined effects the mechanical advantages of the pulley block 32 and the lateral and vertical offset orientation of the pivoting pulley 26 from the axis of the zip line cable 12, the braking block 22 may travel a distance along the zip line cable 12 which is approximately three times the distance travelled by the braking piston 30 within the braking cylinder 28 in a preferably vertical direction to provide the pneumatic braking resistance. As can be appreciated by one of ordinary skill in the art, other arrangements of pulley blocks and braking cables may provide different ranges of mechanical advantage between the pneumatic piston 30 and the braking block 22.

As shown in FIG. 7, the pulley block 32 is preferably connected to the pneumatic piston 30 through a piston cable 44, which is routed through a cylinder seal 46. The piston cable 44 may be made of stranded steel wire cable or fiber rope or other suitable material. The piston cable 44 may also be comprised of a rigid or semi-rigid rod or shaft connecting the pulley block 32 with the piston eyelet 50. The cylinder seal 46 minimizes the loss of compressed air from the cylinder 28 during the braking process, while minimizing friction and wear against the piston cable 44. The cylinder seal 46 may be made of a low-friction, wear-resistant, semi-flexible material, such as Teflon® or nylon, to promote an effective seal, while minimizing friction and wear against the piston cable 44.

As shown in FIGS. 8 and 9, in one embodiment, the piston cable 44 is connected to the pneumatic piston 30 by a piston eyelet 50. Also, as shown in FIGS. 8 and 9, in one embodiment, the pneumatic piston 30 may be fitted with one or more replaceable wear strips 40 which slide against the interior wall of the cylinder 28. The wear strips 40 are preferably comprised of a low-friction, wear-resistant, semi-flexible material, such as Teflon® or nylon, to promote an effective seal between the piston 30 and the interior wall of the cylinder 28 during the braking process, while minimizing friction and wear against the piston 30 and the cylinder wall, thus providing a sacrificial wear surface which protects the larger, more costly components.

Figure 10:
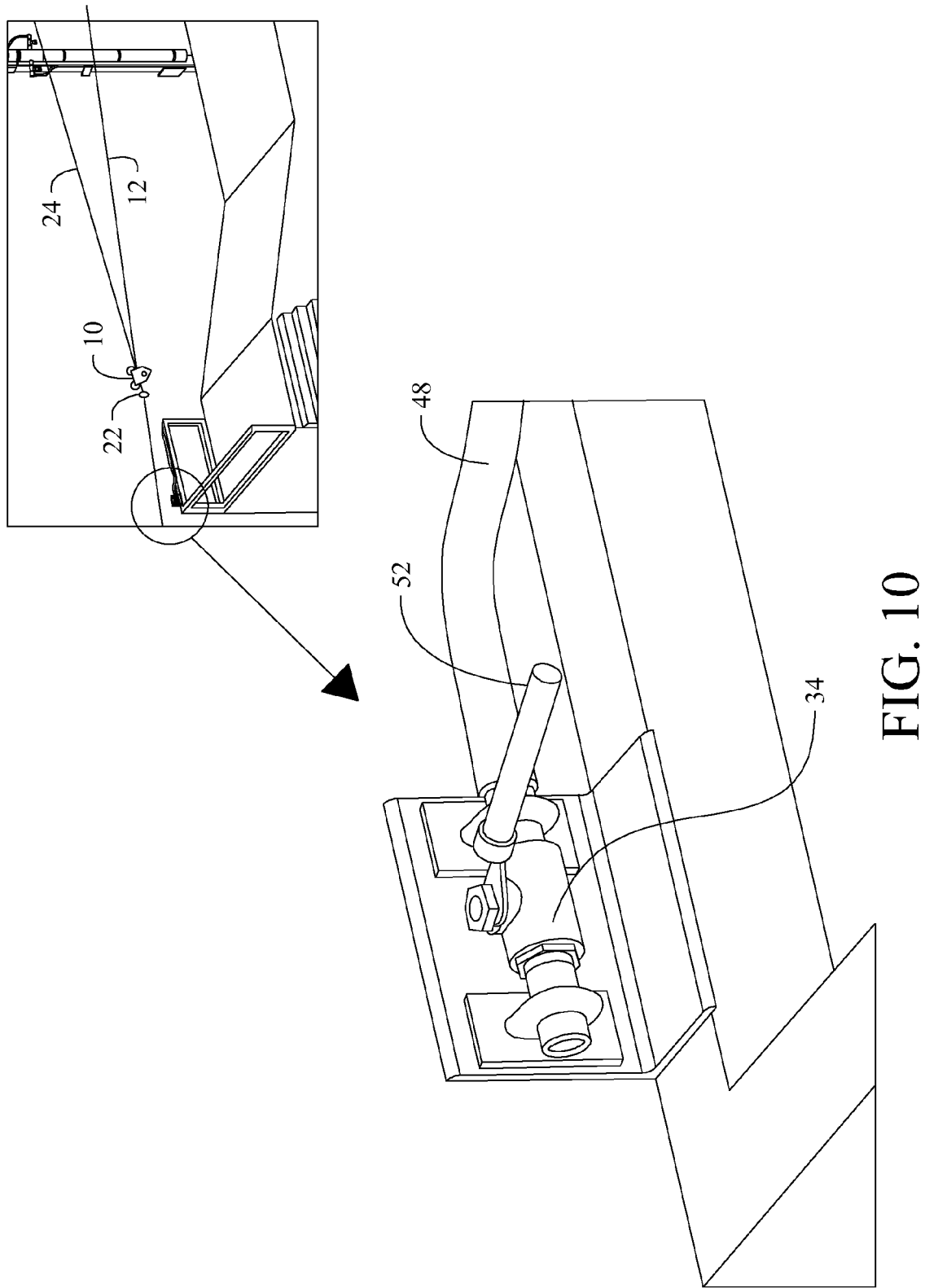
FIG. 10 is a perspective view of a manually-operated relief valve of one embodiment of a trolley braking system in accordance with the present invention.

As shown in FIG. 10, in one embodiment, the braking system in accordance with the present invention may also include a manually-operated relief valve 34 to vent a controlled amount of compressed air from the cylinder during braking, so that the applied braking force may be adjusted to accommodate the rider's weight and cable slope. The manually-operated relief valve 34 may be any type of valve suitable for controlling the flow of compressed air, such as a ball valve, and may be biased to the closed position by a spring or other bias means. The manually-operated relief valve 34 is connected to the interior of braking cylinder 28 by relief valve air line 48. The manually-operated relief valve 34 has an actuating lever 52 that is handle-shaped to facilitate operation by a user, preferably at or near the landing platform 18. The braking resistance provided by the braking cylinder 28 may be adjusted by varying the opening in the manual relief valve 34 to allow more or less accumulated compressed air in the braking cylinder 28 to escape as the pneumatic piston 30 is drawn into the braking cylinder 28 by the kinetic energy of the zipline rider. As shown in FIG. 2, the manual relief valve 34 is preferably located proximate the landing platform 18 for easy access by users for adjustment of braking force to accommodate the arriving riders. As is known and understood in the art, the cylinder 28 and/or the release valve air lines 48 may be fitted with safety relief valves to allow for escape of compressed air in the event that the pressure exceeds a desired level in the system.

Additionally or alternatively, the braking system in accordance with the present invention may include a spring-loaded relief valve 42 that is configured to be activated to the open position by the pulley block 32 when the pneumatic piston is drawn into the cylinder a predetermined distance. Spring-loaded relief valve 42 may be any type of valve suitable for controlling the flow of compressed air, such as a ball valve biased to the closed position by a spring or other bias means. Spring-loaded relief valve 42 is connected to the interior of braking cylinder 28 by relief valve air line 48. As shown in FIG. 7, the actuating lever 52 of spring-loaded relief valve 42 is positioned along the travel path of the pulley block 32 so that it can be contacted and actuated by the pulley block 32 as the pneumatic piston 30 reaches the end of its travel within the braking cylinder 28. This spring-loaded relief valve 42 releases the accumulated pneumatic pressure in braking cylinder 28 at the end of the braking process, so that the trolley 10 and rider are not pulled backwards on the zip line cable 12 by the braking block 22 from residual pressure in cylinder 28. In this manner, after the rider has dismounted the trolley 10 to the landing platform 18, the trolley 10 is removed from the zip line cable 12, and the weight of the pneumatic piston 30 creates a tension force on the braking cable 24, which draws the braking block 22 backwards on the zip line cable 12 to the ready position adjacent the support pole 20. Thus, the braking block 22 is in position on the zip line cable 12 to receive and safely reduce the speed of the next zip line rider to arrive at the landing platform 18.

Also, the lower part of the cylinder 28 may be fitted with a one-way flapper valve to selectively allow the inflow of ambient air into the cylinder 28 during the braking process. Then, when the braking load from the rider's kinetic energy is dissipated and the tension force on the piston 30 from the braking cable 24 is reduced, the one-way flapper valve will close, and the trapped ambient air below the piston 30 in the cylinder 28 will prevent the piston 30 from springing back due to the residual pressure in the cylinder 28. An opening of desired size in the one-way flapper valve or other portion of the lower cylinder 28 may allow the controlled release of the trapped ambient air below the piston 30 in the cylinder 28, thus gradually allowing the weight of the pneumatic piston 30 to create a tension force on the braking cable 24, which draws the braking block 22 backwards on the zip line cable 12.

Figure 11:
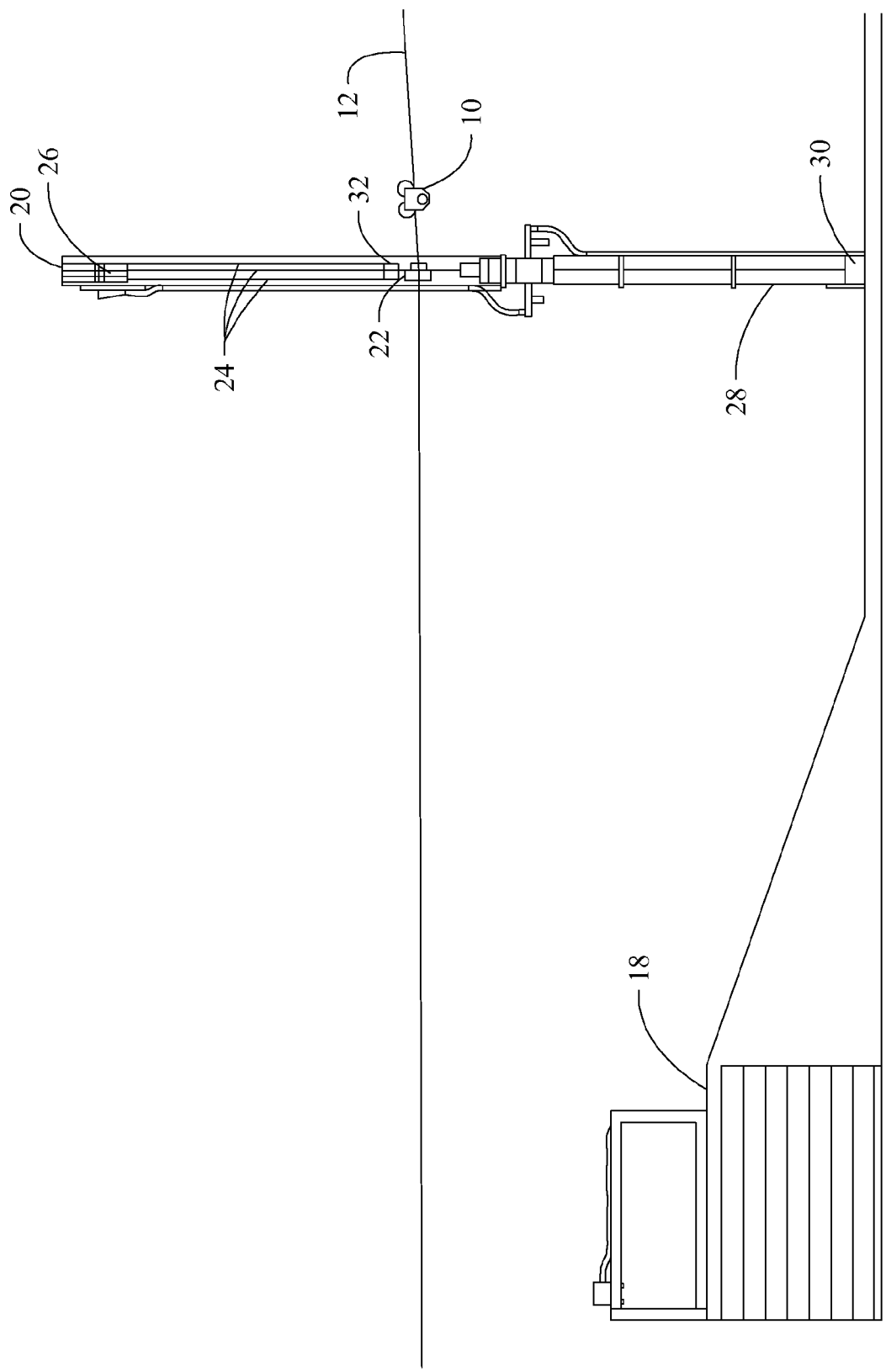
FIGS. 11-13 are side views illustrating the operation of one embodiment of a trolley braking system in accordance with the present invention.
Figure 12:
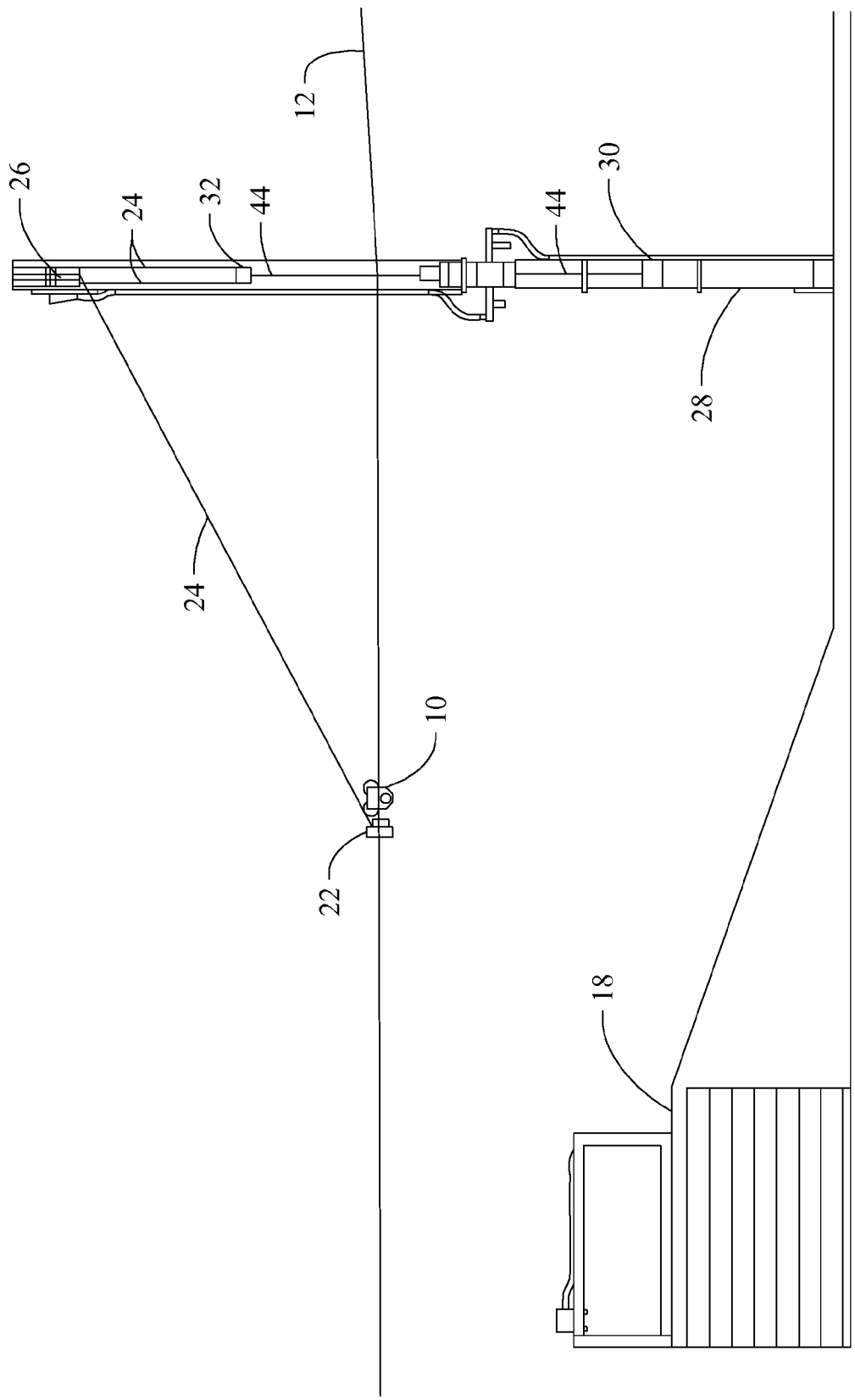
Figure 13:
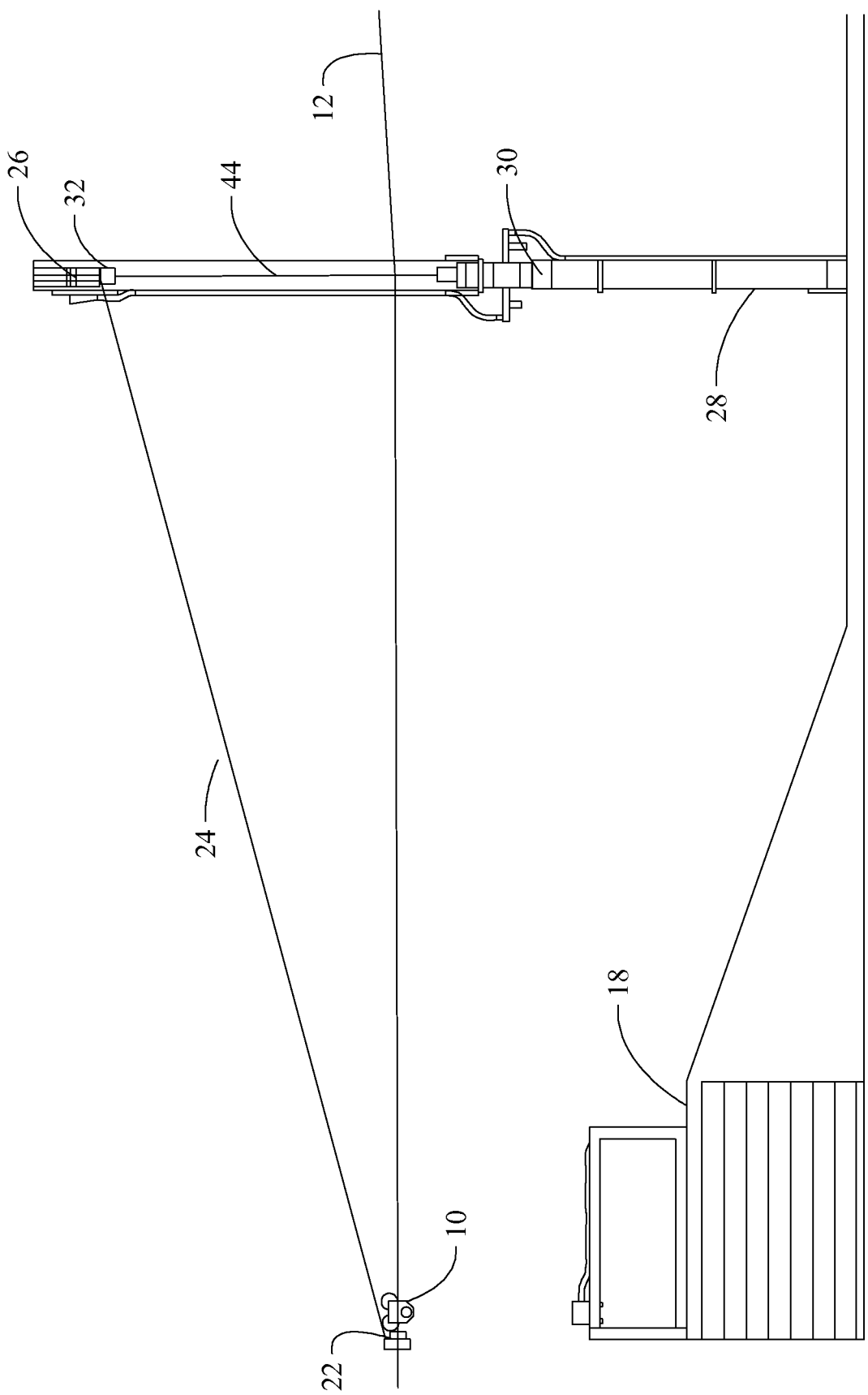

The operation of a braking system according to a preferred embodiment of the present invention is illustrated in FIGS. 11-13. As shown in FIG. 11 the braking block 22 is mounted on the cable 12 near the support pole 20, upon which is mounted the pneumatic cylinder 28. Also, as shown in FIG. 11, the pneumatic piston 30 is located at the lower portion of the pneumatic cylinder 28. As illustrated in FIG. 12, as the trolley 10 contacts the braking block 22 on the cable 12, it forces the braking block 22 along the cable 12 towards the landing platform 18, and creates a tensile force in braking cable 24. This tensile force in the braking cable 24 exerts an upward force through the pulley block 32 on the piston cable 44 which pulls the pneumatic piston 30 vertically within the cylinder. This movement of the piston 30 this causes a volume of compressed air in the cylinder 28 above piston 30, which resists the forward motion of the braking block 22 and the trolley 10 which is traveling behind it on cable 12. As shown in FIG. 13, as the braking block 22 proceeds to a point above the landing platform 18, the braking cable 24 extends to the point that the piston 30 travels to its most vertical position in the cylinder 28. At this time, the pulley block 32 reaches the end of its travel and contacts the valve actuation lever 52 of the spring-loaded relief valve 42. The opening of this valve releases the compressed air in the cylinder 28, and relieves most of the tensile force on braking cable 24, so that the trolley 10 may be removed from the cable 12. Then, the braking block 22 is free to travel on the cable 12, and is pulled back to its starting position adjacent the support pole 20 as illustrated in FIG. 11 due to the weight of the piston 30 acting through the braking cable 24.

In summary, a preferred embodiment of the present invention comprises a braking system for a trolley which suspends and transports a rider on a cable to a landing platform which includes a cylinder having a closed end and a piston slidably mounted in the interior, the cylinder fixedly mounted to a support proximate the landing platform; a braking cable secured to the piston, the braking cable routed through an opening in the closed end of the cylinder; and a braking block slidably mounted on the cable between the trolley and the landing platform, the braking block connected to the braking cable.

In another preferred embodiment, the present invention comprises an apparatus for transporting a rider between a point and a landing platform which includes a cable; a plurality of supports configured to suspend the cable between the point and the landing platform; a trolley for suspending and transporting the rider supported by a harness on the cable; and a braking system comprising a cylinder having a closed end and a piston slidably mounted in the interior, the cylinder fixedly mounted to a support proximate the landing platform; a braking cable secured to the piston, the braking cable routed through an opening in the closed end of the cylinder; and a pulley rotatably mounted on the cable between the trolley and the landing platform, the pulley connected to the braking cable.

In another preferred embodiment, the present invention comprises a method for transporting a rider between a point and a landing platform comprising the steps of providing a cable, and a plurality of supports configured to suspend the cable between the point and the landing platform; suspending the rider by a harness attached to a trolley on the cable; providing a braking system comprising a cylinder having a closed end and a piston slidably mounted in the interior, the cylinder fixedly mounted to a support proximate the landing platform; a braking cable secured to the piston, the braking cable routed through an opening in the closed end of the cylinder; and a braking block connected to the braking cable slidably mounted on the cable; and positioning the braking block between the trolley and the landing platform.

These examples are provided for the purposes of illustration and the present invention is not limited to them.

What is claimed is:

1. A braking system for a trolley which suspends and transports a rider on a cable to a landing platform comprising:
   a cylinder having a closed end and a piston slidably mounted in the interior, the cylinder fixedly mounted to a support proximate the landing platform;
   a braking cable secured to the piston, the braking cable routed through an opening in the closed end of the cylinder;
   a relief valve in pneumatic communication with the cylinder configured to be opened by movement of the braking cable as the piston approaches the closed end of the cylinder; and
   a braking block slidably mounted on the cable between the trolley and the landing platform, the braking block connected to the braking cable.

2. The braking system of claim 1 wherein the relief valve is biased to the closed position.

3. A braking system for a trolley which suspends and transports a rider on a cable to a landing platform comprising:
   a cylinder having a closed end and a piston slidably mounted in the interior, the cylinder fixedly mounted to a support proximate the landing platform;
   a braking cable secured to the piston, the braking cable routed through an opening in the closed end of the cylinder; and
   a braking block slidably mounted on the cable between the trolley and the landing platform, the braking block connected to the braking cable,
   wherein the braking cable is routed over a pulley which is pivotally mounted to the support and through a pulley block intermediate the pivotally-mounted pulley and the piston.

* * * * *